United States Patent
Klepal et al.

(10) Patent No.: US 9,217,788 B2
(45) Date of Patent: Dec. 22, 2015

(54) LOCATION AND TRACKING SYSTEM

(75) Inventors: Martin Klepal, County Cork (IE);
Widyawan, Yogyakarta (ID); Dirk Pesch, County Cork (IE)

(73) Assignee: CORK INSTITUTE OF TECHNOLOGY, County Cork (IE)

( * ) Notice: Subject to any disclaimer, the term of this patent is extended or adjusted under 35 U.S.C. 154(b) by 1060 days.

(21) Appl. No.: 13/138,653

(22) PCT Filed: Mar. 18, 2010

(86) PCT No.: PCT/IE2010/000014
§ 371 (c)(1),
(2), (4) Date: Sep. 15, 2011

(87) PCT Pub. No.: WO2010/106530
PCT Pub. Date: Sep. 23, 2010

(65) Prior Publication Data
US 2012/0007779 A1    Jan. 12, 2012

(30) Foreign Application Priority Data
Mar. 19, 2009    (IE) .................................... 2009/0206

(51) Int. Cl.
G01S 5/02    (2010.01)

(52) U.S. Cl.
CPC ............... *G01S 5/0252* (2013.01); *G01S 5/021* (2013.01)

(58) Field of Classification Search
CPC ....... G01S 5/00; G01S 5/0242; G01S 5/0252; G01S 5/021
See application file for complete search history.

(56) References Cited

U.S. PATENT DOCUMENTS

| 7,250,907 B2 * | 7/2007 | Krumm et al. ................. 342/451 |
| 2004/0259575 A1 | 12/2004 | Perez-Breva |
| 2006/0019679 A1 * | 1/2006 | Rappaport et al. ......... 455/456.5 |
| 2007/0149216 A1 | 6/2007 | Misikangas |

(Continued)

FOREIGN PATENT DOCUMENTS

| WO | 2004/008796 | 1/2004 |
| WO | 2007/118518 | 10/2007 |

OTHER PUBLICATIONS

Widyawan, Martin Klepal et al. "Influence of Predicted and Measured Fingerprint on the Accuracy of RSSI-based Indoor Location Systems" 4$^{th}$ Workshop on Positioning, Navigation and Communication 2007 (WPNC'07), Hannover, Germany.*

(Continued)

*Primary Examiner* — Cassie Galt
(74) *Attorney, Agent, or Firm* — Jacobson Holman, PLLC.

(57) ABSTRACT

A location and tracking system has wireless base stations, an input interface, and a processor. It receives initial physical environment inputs for an environment, with default signal attenuation values for wall and obstacle segments. An initial channel parameters fingerprint of projected signal strengths in the environment is generated according to the initial physical environment model. The processor simulates motion of the node along a $h_{th}$ trajectory to create a corresponding fitness function describing how similar the channel parameters estimated along the $h^{th}$ trajectory by the prediction model are to gathered channel parameters by the mobile node along its trajectory. The model and the fingerprint are subsequently modified in iterations as possible mobile node trajectories are determined to perform location error estimation which takes into account the re-calculated fingerprint and gathered channel parameters and the $h_{th}$ trajectory as a ground truth.

11 Claims, 12 Drawing Sheets

(56) References Cited

U.S. PATENT DOCUMENTS

2008/0036661 A1* 2/2008 Smith et al. .................. 342/464
2010/0135178 A1* 6/2010 Aggarwal et al. ............. 370/252

OTHER PUBLICATIONS

R. Hoppe et al., "Wideband Propagation Modelling for Indoor Environments and for Radio Transmission into Buildings," Personal, Indoor and Mobile Radio Communications, 2000, The 11th IEEE International Symposium, vol. 1, pp. 282-286.

Widyawan et al., "Influence on Predicted and Measured Fingerprint on the Accuracy of RSSI-based Indoor Location Systems," 4th Workshop on Positioning, Navigation and Communication, 2007, pp. 145-151.

* cited by examiner o————o Wall segment

— Edge   ○ Access Point
▫ Vertex  △ Starting Point

○ Access Point (a) Voronoi graph    (b) Vertices and edges of the graph

PDF of velocity with $v_{t-1}$ = 0 m/s.

Standard deviation of target direction $\alpha_t$.

PDF of the direction with $\alpha_{t-1} = 0$.

Evolution of particles with motion model.

Gaussian distribution $p_{hit}$.

Penalty $\eta$ for missing or extra RSS value.

Illustration for the calculation of the measurement model.

(a) RSS fingerprint.

(b) Initial particle distribution.

(c) Measurement probability.

(d) Updated particle distribution

Update of the particles distribution with the likelihood observation function.

# LOCATION AND TRACKING SYSTEM

This is a national stage of PCT/IE10/000014 filed Mar. 18, 2010 and published in English, which claims the priority of Irish number 2009/0206 filed Mar. 19, 2009, hereby incorporated by reference.

FIELD OF THE INVENTION

The invention relates to location and tracking systems such as those within a building. An example is a system for navigation in large office buildings, for tracking location of security personnel in an airport.

In a typical location and tracking system the position of a mobile node is inferred from location-specific physical parameters of the wireless communication channel which exists between fixed nodes and the mobile node such as RSS (Radio Signal Strength), TDOA (Time Difference of Arrival), impulse response characteristics, angle of arrival, and multipath propagation characteristics.

However, the wireless channel parameters in a multi-path environment (such as indoor environment) are subject to the electromagnetic properties of the environment such as signal transition and reflection losses, signal phase shift, and signal depolarisation when interacting with the environment.

The invention is directed towards providing a location and tracking system with improved ability to track locations of mobile nodes. Another objective is to avoid need for considerable additional equipment in the environment.

SUMMARY OF THE INVENTION

According to the invention, there is provided a location and tracking system comprising wireless base stations, an input interface, and a processor, wherein the processor is adapted to
(a) receive physical environment inputs and provide an initial physical environment model;
(b) generate an initial channel parameters fingerprint for the environment according to the initial environment model;
(c) monitor channel parameters of a mobile node in the environment and use said parameters and the fingerprint to locate the mobile node;
(d) modify the environment model according to said node locating step (c);
(e) update the fingerprint according to the modification of the environment model in step (d); and
(f) repeat steps (c) to (e) in subsequent iterations.

In another aspect, the invention provides a location and tracking method performed by a location and tracking system linked with wireless base stations, and having an input interface, and a processor, wherein the method comprises the steps of:
(a) receiving physical environment inputs and providing an initial physical environment model;
(b) generating an initial channel parameters fingerprint for the environment according to the initial environment model;
(c) monitoring channel parameters of a mobile node in the environment and using said parameters and the fingerprint to locate the mobile node;
(d) modifying the environment model according to said node locating step (c);
(e) updating the fingerprint according to the modification of the environment model in step (d); and
(f) repeating steps (c) to (e) in subsequent iterations.

The initial environmental model may be generated in step (a) by the system in response to the inputs or it may be received as a pre-generated file. The invention achieves by virtue of steps (b) to (5) self-calibration for location of mobile nodes in the environment. Any change made to the environment, such as modification of a base station, erection of a partition wall, or even movement of a piece of furniture will be automatically taken into account for further location of mobile nodes.

In one embodiment, the location engine is adapted to execute a filtering algorithm to estimate location in step (c).

In one embodiment, the processor is adapted to determine in step (c) possible mobile node trajectories, and to use said trajectories for environment model modification in step (d) and subsequent fingerprint updating in step (e).

In one embodiment, the processor is adapted to dynamically maintain a multi-hypothesis decision tree in step (c) in which it iteratively evolves branches representing the most likely mobile node trajectories.

In another embodiment, the processor is adapted to use mobile node speed estimation for steps (c) and (d).

In one embodiment, the processor is adapted to modify wall segment parameters of the environment model in step (d).

In one embodiment, in step (a) the inputs include:
layout of main obstacles including building floor plans and wall layout;
layout of base stations; and
starting position of a mobile node.

In a further embodiment, parameters of environment obstacles are initially set to a common default value.

In one embodiment, for the step (a) the processor is adapted to divide the obstacles into smaller segments and to optimise parameters of the smaller segments to more precisely represent each segment's mean local influence on signal attenuation.

In one embodiment, the processor is adapted to apply parameters to the segments so that they characterise the obstacles they are part of and also the influence of smaller obstacles including furniture in proximity to large obstacles.

In one embodiment, for step (c) the processor is adapted to use an empirical signal propagation model with a linear optimisation method for prediction of received signal strength.

In one embodiment, the processor is adapted to perform, for steps (c) and (d), simulation of an $m^{th}$ mobile node motion along a $h^{th}$ trajectory and creation of a corresponding fitness function.

In one embodiment, the fitness function describes how similar the channel parameters estimated along the $h^{th}$ trajectory by the prediction model, which uses current obstacles parameters, is to gathered channel parameters by a mobile node along its truth trajectory.

In one embodiment, the fitness function takes the form of a set of linear equations for an optimisation method.

In one embodiment, the processor is adapted to execute a particle filter algorithm to locate a mobile node in step (c), in which particles are mapped to the physical environment as represented by the physical environment model.

In one embodiment, the processor is adapted to generate visual displays of the physical environment in which particles distribution is illustrated for user visualisation of likelihoods of locations of the mobile node.

In one embodiment, the processor is adapted to eliminate particles in successive iterations according to constraints imposed by the physical environment model and a motion model, in which remaining particles converge around the actual mobile node location.

In another embodiment, the processor is adapted to automatically recognise rooms in the physical environment model and to maintain a count of particles in each room to provide a per-room probability of presence of the mobile node.

In one embodiment, the processor is adapted to provide a random or uniform initial particle distribution mapped into the physical environment model, to filter the initial particle distribution with a likelihood observation function to generate a second particle distribution and to use said distribution for a next filtering iteration.

In one embodiment, the likelihood observation function is given by combining densities to obtain a likelihood observation function of measurement p(zt|xt), and is given by:

$$p(z_t \mid x_t) = \left[\prod_{k \in K} p_{hit}(z_t^k \mid x_t)\right]^{\frac{1}{|K|}} \cdot \prod_{k \in L} p_{miss}(z_t^k \mid x_t) \cdot \prod_{k \in M} p_{extra}(z_t^k \mid x_t) \cdot \beta \quad (3.27)$$

with $$\beta = \frac{|K|}{|K| + |L| + |M|}$$

where:
- K ... is the set of measurement in $(z_t \cap z^+_t)$,
- L ... is the set of measurement in $(z^+_t - z_t)$,
- M ... is the set of measurement in $(z_t - z^+_t)$,
- and the expressions of |K|, |L|, |M| denotes the number of elements in K, L, M respectively,
- β represents the weighting factor and
- k denotes AP identification.

In one embodiment, the processor is adapted to perform step (d) by adjusting the current parameters of obstacles towards the optimised parameters of obstacles which influence the channel parameters along the $h^{th}$ trajectory, in which the adjustment is given by:

$$Lw_t^i = Lw_{t-1}^i + \Delta Lw_t^i,$$

where:
- $Lw_t^i$ ... represents $i^{th}$ wall segment loss at time (index of iteration) t,
- $Lw_{t-1}^i$ ... represents $i^{th}$ wall segment loss at iteration t−1, and
- $\Delta Lw_t^i$ ... denotes the delta of a wall segment loss at time t.

In another aspect, the invention provides a computer readable medium comprising software code adapted to perform operations of a location and tracking system as defined above in any embodiment when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 1:
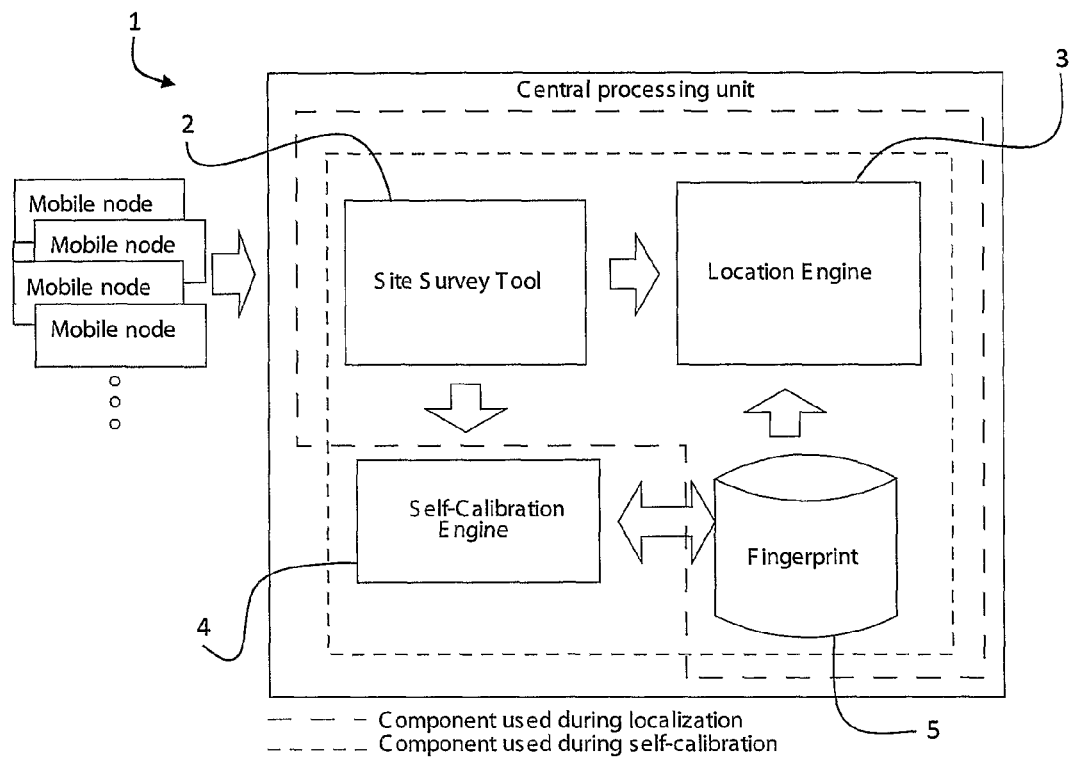
FIG. 1 is a block diagram illustrating the main components of a location and tracking system of the invention.
Figure 2:
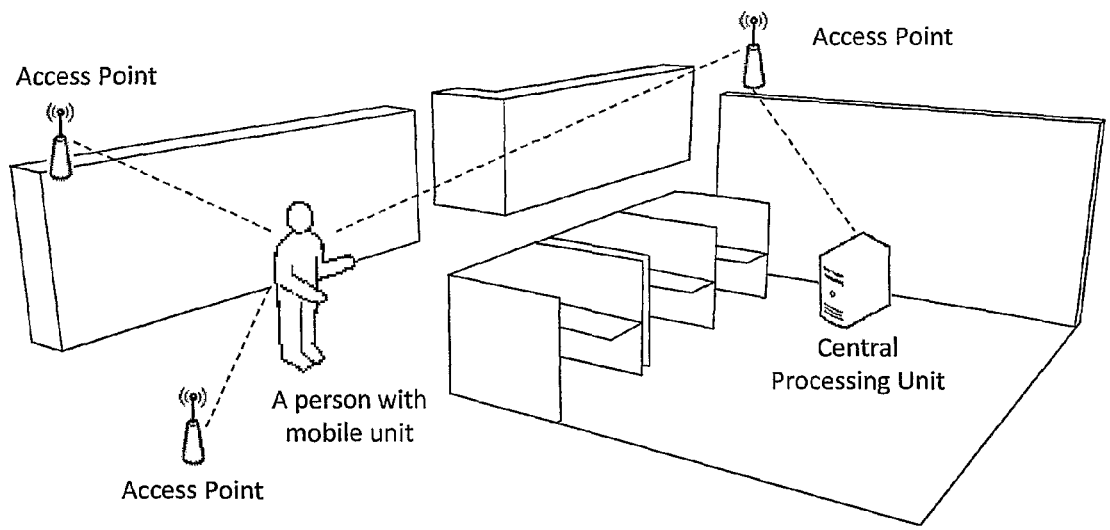
FIG. 2 is a perspective view of a typical indoor environment in which the system operates.

Referring to FIG. 1 a location and tracking system 1 comprises a site survey tool 2, a location engine 3, a self-calibration engine 4, and a fingerprint database 5. The system operates for a wireless network of access points such as shown in FIG. 2. In hardware terms it comprises a conventional PC computer and mobile WiFi enabled handheld devices such as smart phones linked to wireless access points of a conventional WiFi network The system 1 generates from initialization data a model of the physical environment. The model may for example be in the form of data representing geometry of lines in plan and signal attenuation values for the lines.

The system then uses this model to generate a fingerprint of projected signal strengths in the environment. The term "fingerprint" means a map of channel parameters (such as signal strength and Time of Arrival, TOA) at all of a set of points in the environment. These points may be in a regular grid pattern, with position of some points being offset to avoid being coincident with an obstruction such as a wall.

The system maintains a fingerprint for every environment model. There may be only one model at any one time, or there may be a number. Where the latter, the system may assign a weighting to each model to indicate its confidence value. For example if models are being maintained for a person moving through a building, the system may maintain a set of possible trajectories for the person. There might be a model for each trajectory, but a confidence weighting assigned according to the degree of confidence in the associated trajectory. In another example, the system is configured to maintain only one model at any time. This may correspond to only the trajectory for a single mobile node, and with the highest confidence value. The choice of number of models to maintain is dependent on the processing resources in the system and the extent of complexity of the environment, and the frequency with which it is changed.

The hardware of the system is an existing wireless communication network, and so no additional hardware is required where there is a wireless communication network such as a WiFi network in place.

Upon detection of a mobile node in the environment the system estimates position of the node according to the current fingerprint, and in real-time performs self-calibration of the environment model, in turn giving rise to fresh updated fingerprints for future tracking. This continuous self-calibration ensures excellent tracking accuracy even with modification of the environment, such as changing of an access point configuration, moving a partition wall, or movement of a metal filing cabinet.

Figure 3:
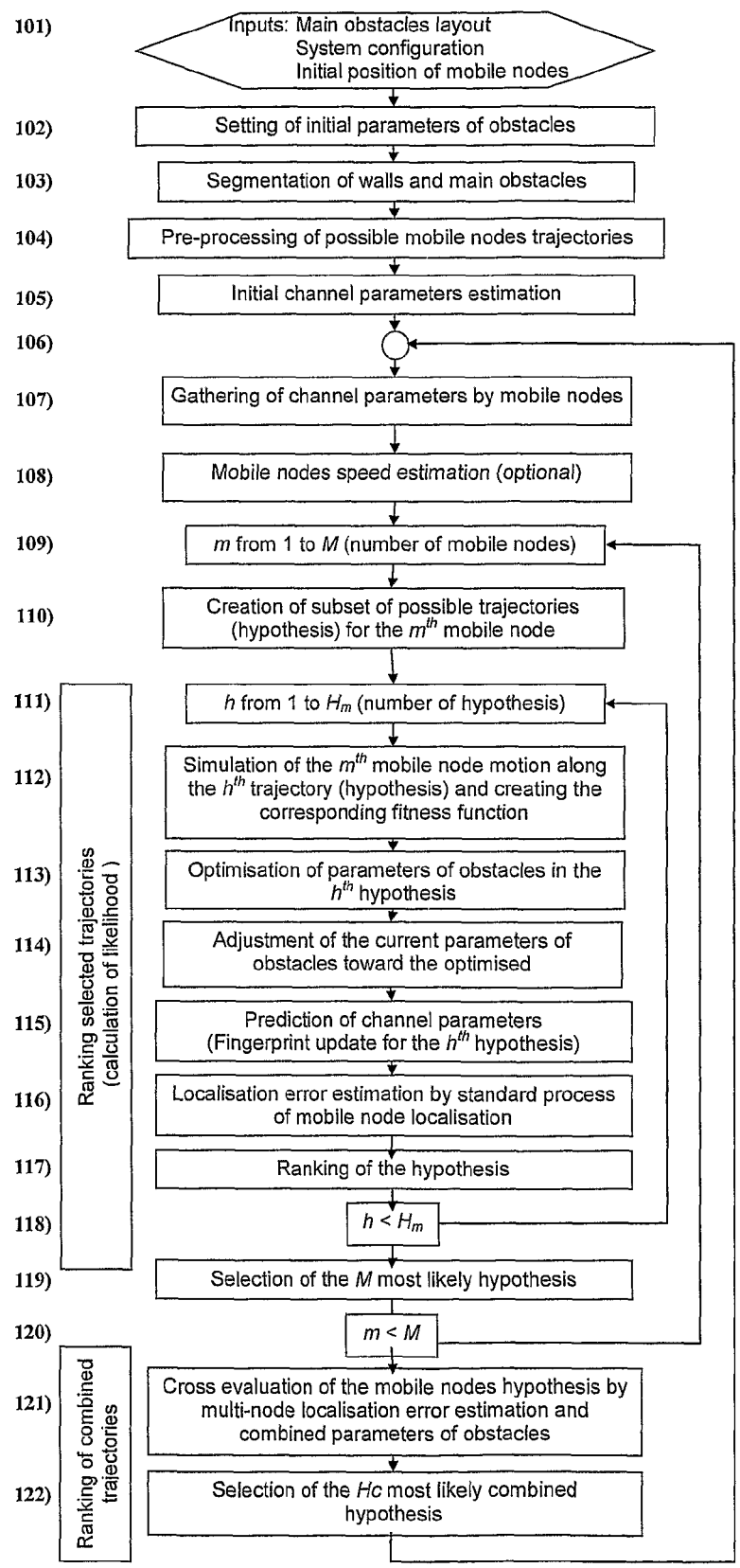
FIG. 3 is a flow diagram illustrating operation of the system to perform mobile node tracking and self-calibration.

The major steps, 101-122, implemented by the systems are shown in FIG. 3. The following describes these steps in detail.

Step 101

Input to the system 1 is:
layout of main obstacles such as building floor plans or wall layout,
layout of location and tracking system fixed nodes,
initial (starting) position of mobile nodes (at the entrance to the building, for example).

Figure 4:
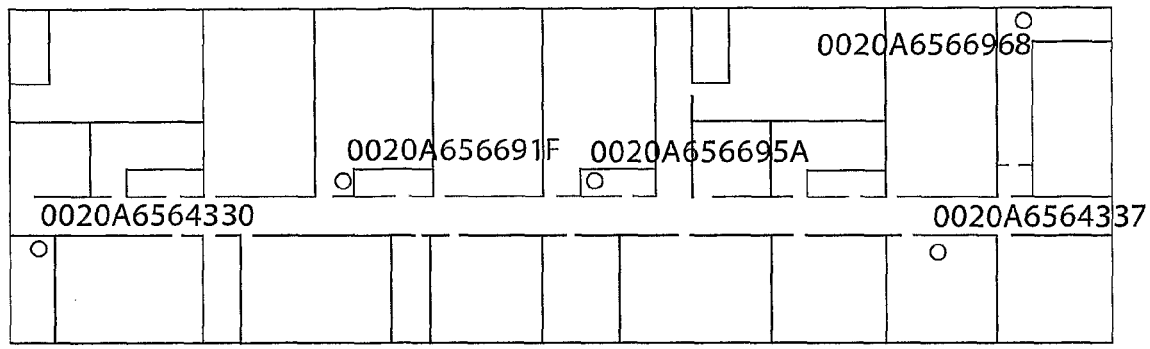
FIG. 4 is an example of a floor plan with a particular wall layout and access points, within which the location of a mobile node is tracked.

FIG. 4 shows the example of a floor-plan with access points ("APs") and wall layout used as an input to the self-calibration system 1.

Step 102

Figure 5:
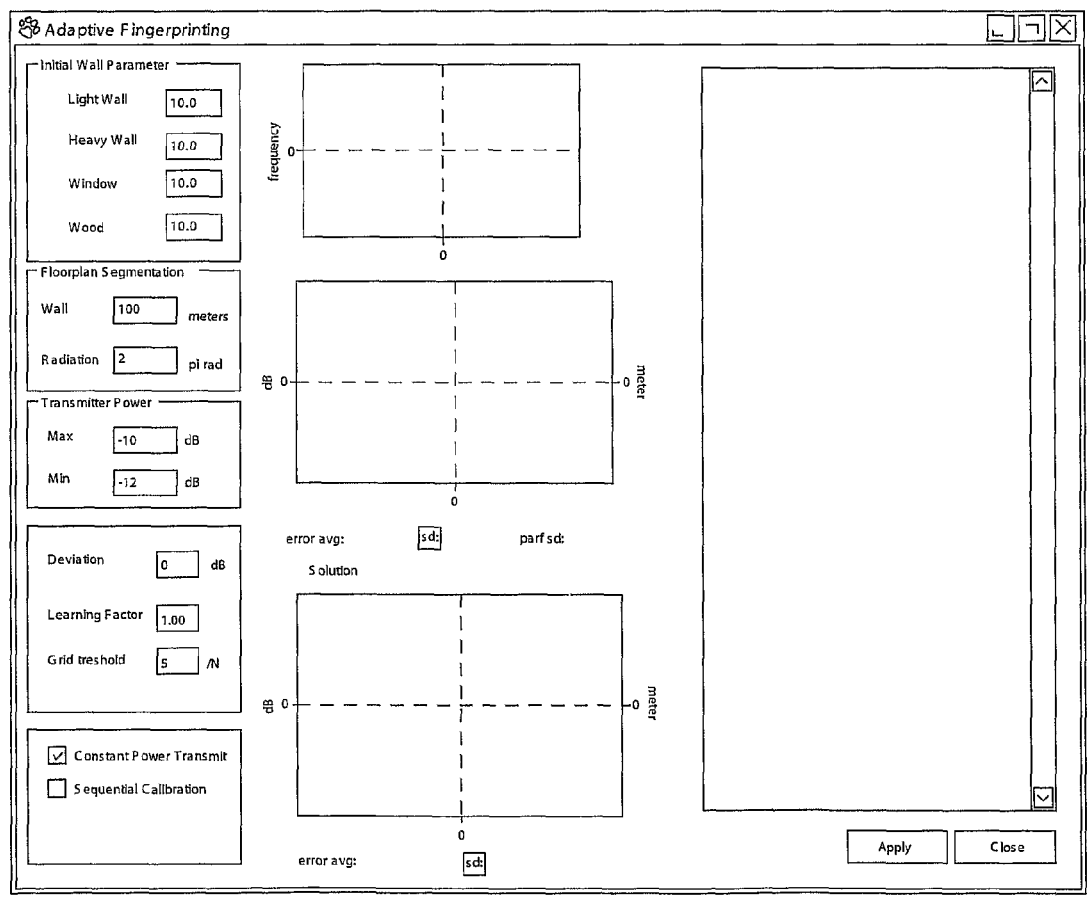
FIG. 5 is a screen shot for initializing the system with environment parameters.

Corresponding parameters of all environment obstacles and therefore all segments are initially set to the same default value. Default values are any reasonable mean values of obstacle parameters as characterised by the channel parameters prediction model used in the next point. The absolute values are not as important as their uniformity throughout the environment in the initial stage. A sample screen for inputting these parameters is shown in FIG. 5.

Step 103

The walls and main obstacles are then divided by the processor into smaller segments. The parameters of smaller segments can be better optimised to more precisely represent the segment's mean local influence on the signal attenuation than long walls. The segment's parameters therefore characterise not only the parameters of walls or main obstacles they are part of, but reflect also the influence of smaller surrounding obstacles such as furniture in the proximity of wall and variation of the longitudinal wall characteristic caused by pipes and ducting within the wall etc., which can have significant influence on the signal attenuation. The size of the segments depends on the type of environment and varies between 2 to 10 meters. We found that the segment size between 2 and 4 meters is suitable for indoor and between 5 and 10 meters for outdoor.

Algorithm 1 shows the algorithm for segmenting walls. The input of the algorithm is segment size (l), and output of the algorithm is a set consisting of segmented wall ---
Algorithm 1: SegmentWall (l, W)
---
1: for each wall in the floor plan
2: d = length of wall
3: walls = div (d, l)
4: if walls quotient > 1
5: w = segment the wall ---
Algorithm 1: SegmentWall (l, W)
---
6: W = W + w
7: else
8: w = the wall
9: W = W + w
10: end if
11: end for
10: return W
---

Figure 6:
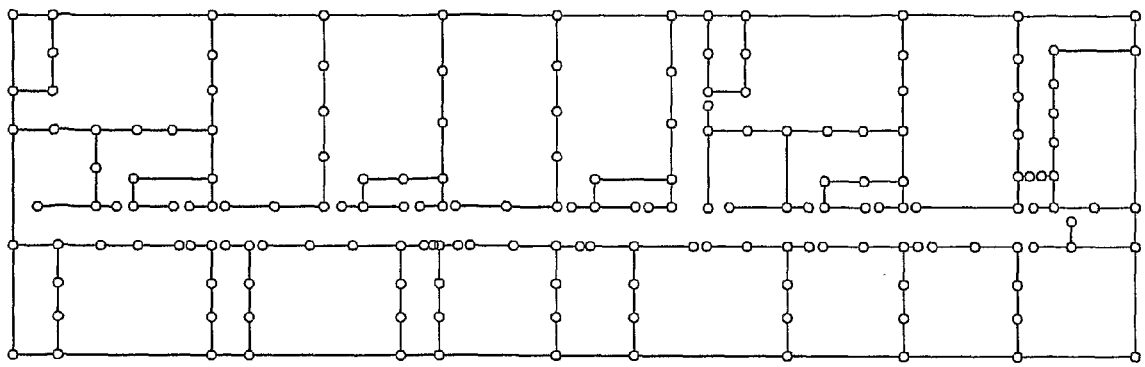
FIG. 6 is another example floor plan, with segmented walls.

FIG. 6 shows example of an environment with segmented walls.

Step 104

The possible trajectories of mobile nodes in the described environment are pre-processed to accelerate the creation of a subset of possible trajectories in step 110. The trajectories are built as a Voronoi diagram of the floor-plan, the graph edge representing all the most likely routes for mobile node movement. The density of the Voronoi diagram varies depending on the predefined requirements on the location accuracy.

Algorithm 2 below shows the steps for creation of possible trajectories. The input of the algorithm is a vertex v in the Voronoi graph G and the distance travelled d by a mobile device. The output of the algorithm is a set of vertices V, which is basically a set of way-points inside the trajectory ---
Algorithm 2: Traverse(v, V, d)
---
1: V = V + {v}
2: D = total length of edges in V
3: if D < d then
4: for each vertex w adjacent to v do
5: Traverse( w, V, d)
6: end for
7: else
8: save V {V is a candidate of trajectory}
9: end if
---

Figure 7:
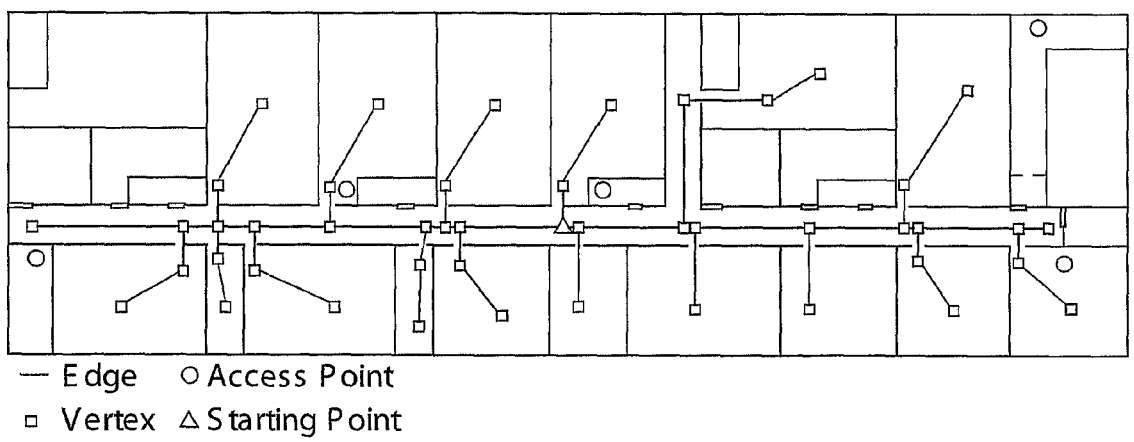
FIG. 7 shows possible trajectories in this environment, represented as a Voronoi diagram in the floor-plan.
Figure 8:
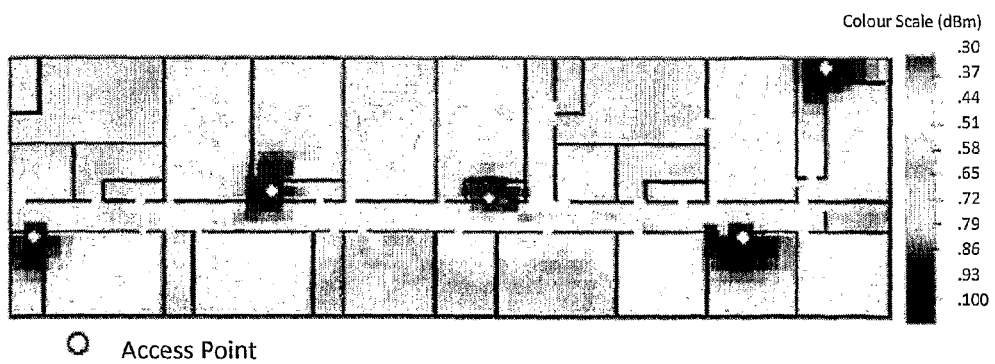
FIG. 8 is display of fingerprints showing predicted channel parameters in an environment, in which the scale represents level of predicted channel parameter such as signal strength in a regular grid.
Figure 9:
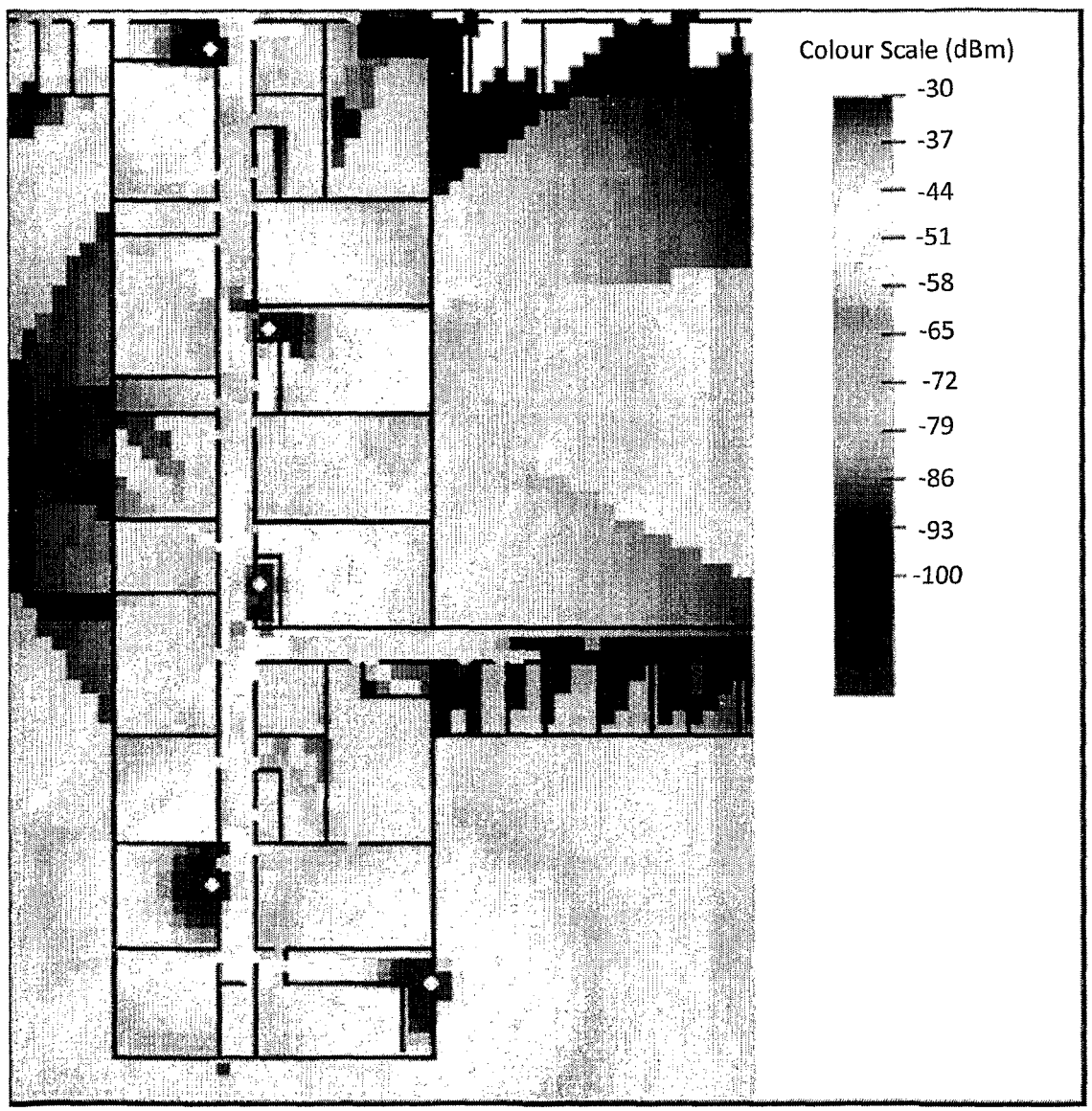
FIG. 9 shows another predicted fingerprint generated from a site-specific prediction model.

FIG. 7 shows a screenshot of the possible subset of motion trajectories in a floor-plan.

Step 105

Estimation of the expected channel parameters fingerprint in the area of interest taking into account the default parameters of obstacles by appropriate empirical or physical channel parameters prediction models.

In this implementation a simple empirical signal propagation model, called Multi-Wall-Model (MWM), is used for prediction of received signal strength (RSS) fingerprint. MWM is chosen because of its simplicity and efficient computation, but also for its suitability to the linear optimisation method used in this implementation. Both of these factors contribute to improving the speed of the overall self-calibration.

In the MWM, the path loss is given by the following equation:

$$L = L_0 + 20\log(d) + \sum_{i=1}^{I} Lw^i + L_f \tag{1}$$

Where:
L ... denotes the predicted signal loss,
$L_0$ ... is the free space loss at a distance of 1 meter from the transmitter,
d ... is the distance from the transmitter to the receiver, .

I . . . is the number of walls intersecting with the signal direct propagation path between the transmitter and receiver (access point and mobile node), $Lw^i$ . . . denotes the contribution of $i^{th}$ wall segment to the total signal loss, $L_f$ . . . is the contribution of floors to the total signal loss.

In this example, self-calibration is used for localisation on a single floor, therefore signal-loss of floors $L_f$ is not considered.

Algorithm 3 below shows the algorithm for signal level prediction with the multi-wall model. The input of the algorithm is position of an access point p. The output is predicted signal level in the environment S.

---
Algorithm 3: Prediction (p)
---
1: P = −10 dB
2: S = ∅
3: for each grid g in the environment
4: d = distance from g to access point p
5: L = calculate with equation (1)
6: s = P − L
7: S = S + s
8: end for
9: return S
---

Step 106

Start of the main loop of an iterative fingerprint self-calibration algorithm by the engine 4.

Step 107

Figure 10:
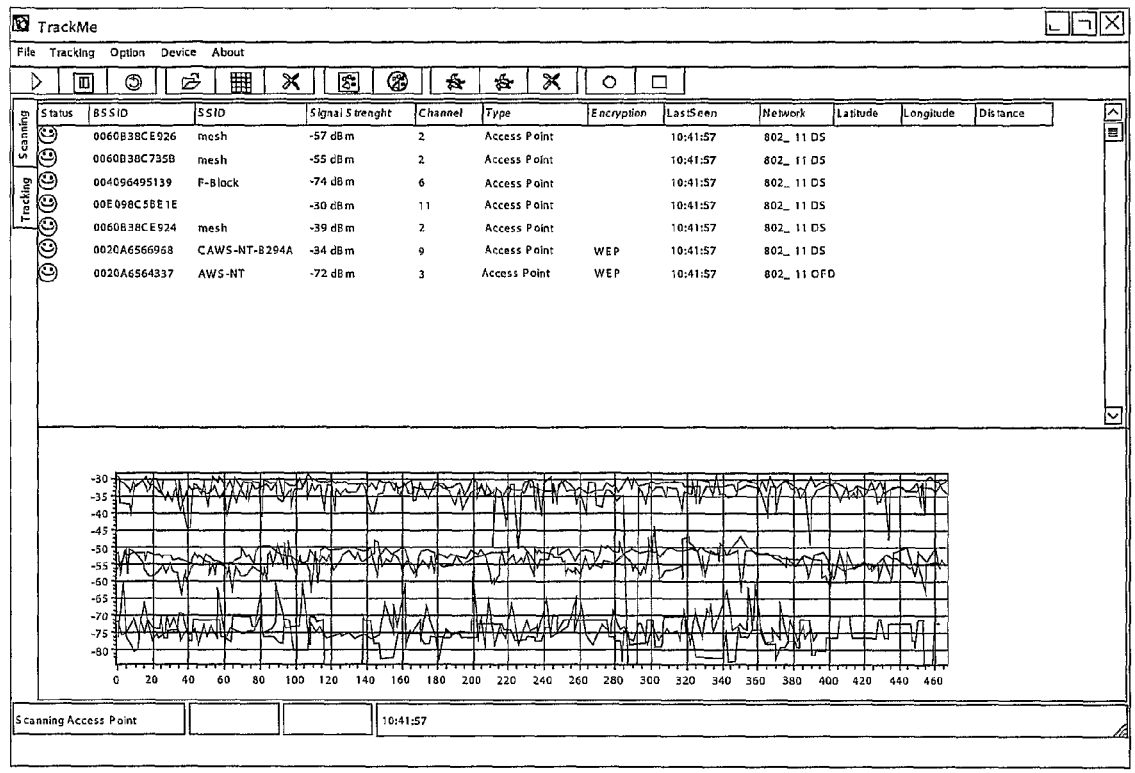
FIG. 10 shows a sample output screen for operation of a site survey module of the system, the screen showing signal strength as measured by a mobile node in the environment.

Mobile nodes, subject to their pinpointing by the location engine 3, gather the observed channel parameters along their motion trajectory, and send them to the survey tool 3. This interval of gathering of parameters can vary from a few seconds to many minutes based on contextual or other information. A sample screen is shown in FIG. 10. The plots at the bottom of this screen are signal strength from different transceivers as seen by the mobile node.

Step 108

The gathered channel parameters could be optionally used by the location engine 3 to estimate motion behaviour of the mobile nodes such as speed and direction.

The motion behaviour estimation can be further improved by additional sensors, especially inertial sensors such as accelerometers, gyroscopes and magnetometers built-in the mobile node. The suitable methods used for estimating the mobile node speed and directions based on measurement of the inertial sensors are called "Dead Reckoning" methods.

Step 109

This is the start of a loop through all participating mobile nodes, M, by the engine 4.

Step 110

Based on the length of the time interval of gathering of channel parameters (also an option on estimated mobile node motion behaviour) and the layout of obstacles in the environment, possible $H_m$ motion trajectories (hypothesis) of the $m^{th}$ mobile node are proposed.

Figure 11:
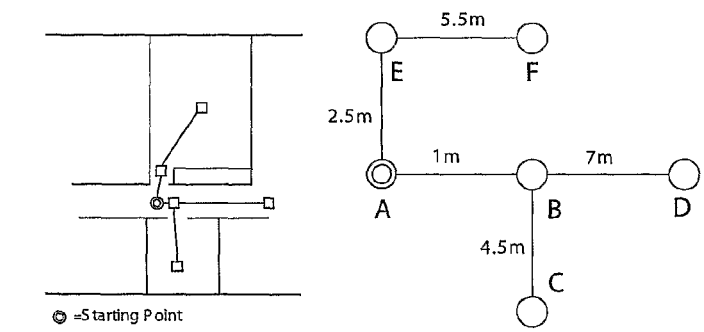
FIG. 11 is a set of diagrams illustrating proposed trajectories for a mobile node at a starting point A.
Figure 11:
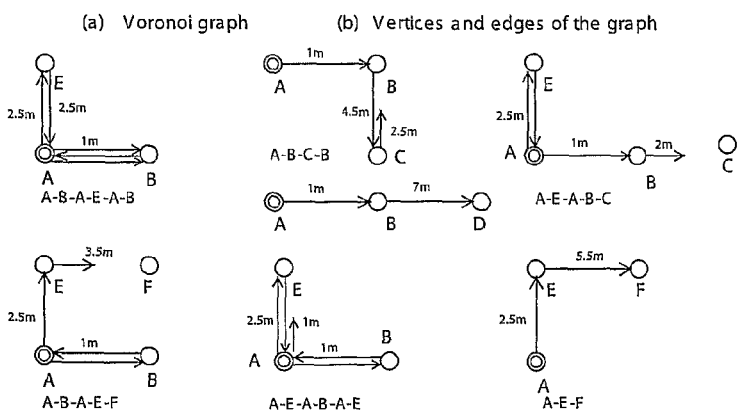
Figure 12:
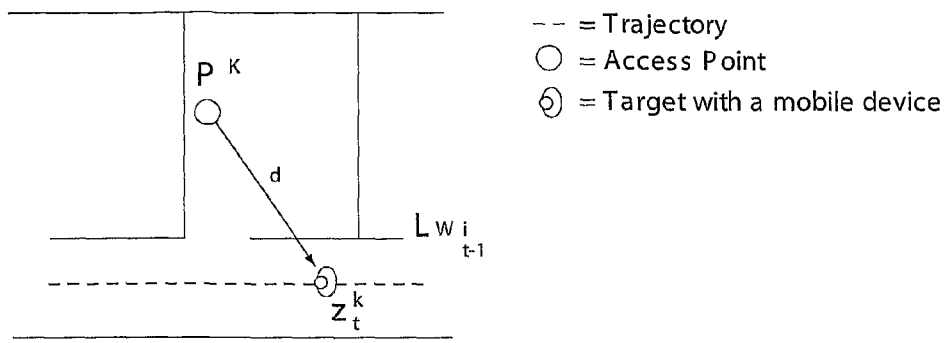
FIG. 12 is a diagram illustrating fitness function creation with a multi-wall model (MWM)

FIG. 11 shows an example of proposed trajectories when a mobile node is at the Starting point A Step 111

This is start of an inner loop for evaluating the likelihood (ranking) of all proposed trajectories (hypothesis), $H_m$.

Step 112

This includes simulation of the $m^{th}$ mobile node motion along the $h^{th}$ trajectory and creation of the corresponding fitness function. The fitness function describes how similar the channel parameters estimated along the $h^{th}$ trajectory by the prediction model, which uses current obstacle parameters, is to the gathered channel parameters by a mobile node along its truth trajectory. The fitness function can take the form of a set of linear equations suited to the optimisation method used in the following step.

In this implementation the localisation is performed on a single floor. Therefore the fitness function for the optimisation of a wall segment parameter considering MWM (1) is written as follows:

$$L = L_1 + 20\log(d) + Lw \quad (2)$$

$$P^k - z_t^k = L_1 + 20\log(d) + Lw_{t-1} + \Delta Lw_t$$

$$\Delta Lw_t = P^k - z_t^k - L_1 - 20\log(d) - Lw_{t-1}$$

Where:

$$Lw = \sum_{i=1}^{I} Lw^j, \Delta Lw = \sum_{i=1}^{I} \Delta Lw^j$$

$\Delta Lw$ . . . denotes the difference of wall segment loss, $P^k$ . . . denotes the power transmitted from access point k, (it is known or can be estimated as additional unknown similarly to by the described optimisation method as if it was an additional wall around the transmitter)

$z_t^k$ . . . represents the RSS measurement gathered by the mobile device from access point k, t . . . denotes time or index of process iteration $Lw^i$ . . . represents an/wall segment loss and $\Delta Lw^i$ . . . denotes the difference of an $i^{th}$ wall segment loss.

Linear equations (2) are then created for every measurement point along the simulated $h^{th}$ trajectory. A created set of the linear equations represents all wall segments which have influence on the signal strength along the trajectory. Since the number of measurements is usually greater than the number of wall segments, the resulting set of linear equations form an over-determined system. This means that the number of equations is greater than the unknowns (i.e.: $\Delta Lw$). A fast and robust algorithm to solve an over-determined linear system is the least-squares method.

Considering this over determined system where m represents the number of linear equations and n is the number of unknown coefficients with m>n. Recalling the fitness function in equation (2), β is the ΔLw, and $y_i$ represents the right hand side of the equation.

The linear system is written:

$$\sum_{j=1}^{n} X_{ij}\beta_j = y_i (i = 1, 2 \ldots m)$$

and the final fitness function in the matrix form suitable for example to the least-squares method:

$$X\beta = y \quad (3)$$

Where:

$$X = \begin{bmatrix} x_{11} & x_{12} & \ldots & x_{1n} \\ x_{21} & x_{22} & \ldots & x_{2n} \\ \vdots & \vdots & \ddots & \vdots \\ x_{m1} & x_{m2} & \ldots & x_{mn} \end{bmatrix}, \beta = \begin{bmatrix} \Delta L_t^1 \\ \Delta Lw_t^2 \\ \vdots \\ \Delta Lw_t^m \end{bmatrix}$$

and $$y = \begin{bmatrix} p^1 - z_t^1 - L_1 - 20\log(d^1) - Lw_{t-1}^1 \\ p^2 - z_t^2 - L_1 - 20\log(d^2) - Lw_{t-1}^2 \\ \vdots \\ p^m - z_t^m - L_1 - 20\log(d^m) - Lw_{t-1}^m \end{bmatrix}$$

Step 113

This step involves application of a formal optimisation method (such as the least square, agent-based, or stochastic search methods) to find optimal parameters of obstacles which maximise the similarity of the predicted channel parameters and gathered channel parameters along the $h^{th}$ trajectory.

In this implementation the least-squares method is used to solve the matrix (3), where the solution is given by:

$$\hat{\beta} = (X^T X)^{-1} X^T y \quad (4)$$

Step 114

This is adjustment of the current parameters of obstacles towards the optimised parameters of obstacles which influence the channel parameters along the $h^{th}$ trajectory.

The adjustment is given by:

$$Lw_t^i = Lw_{t-1}^i + \Delta Lw_t^i,$$

where:
- $Lw_t^i$ ... represents $i^{th}$ wall segment loss at time (index of iteration) t,
- $Lw_{t-1}^i$ ... represents $i^{th}$ wall segment loss at iteration t−1,
- $\Delta Lw_t^i$ denotes the delta of a wall segment loss at time t.

Step 115

This step involves prediction (re-calculation) of the channel parameters fingerprint in the area of interest with a prediction model having adjusted parameters of obstacles.

Step 116

This step involves location error estimation, which takes into account the re-calculated fingerprint and gathered channel parameters and the $h^{th}$ trajectory as a ground truth.

Figure 13:
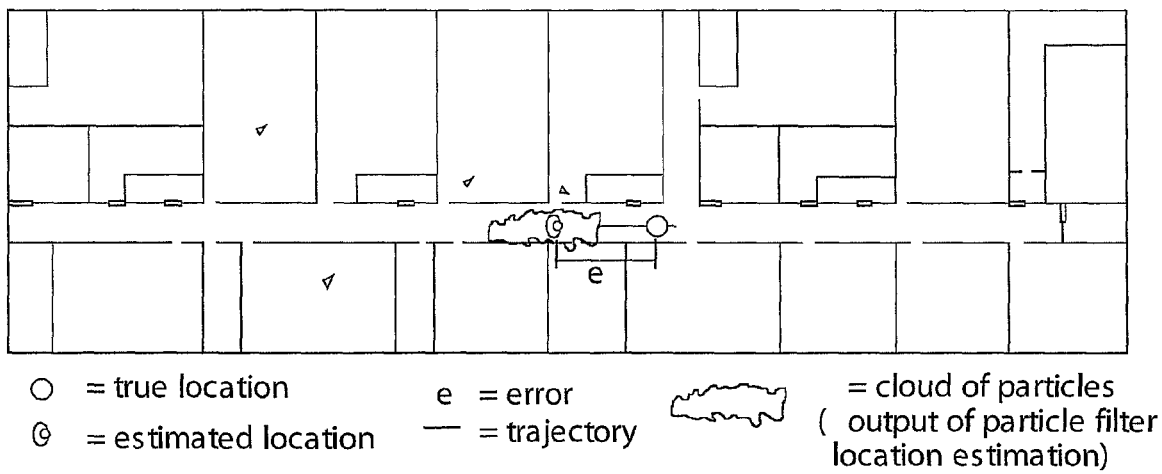
FIG. 13 is a plan view, showing a location error of the position estimated by a particle filter.

FIG. 13 shows an illustration of the localization error.

In this implementation the Particle Filter algorithm (Algorithm 4) is used to estimate the location error, as follows.

---

Algorithm 4: Particle Filter ($\chi_{t-1}$)

1: $\overline{X}_t = X_t = \emptyset$
2: for i = 1 to N do
3:    sample $x_t^i \sim p(x_t|x_{t-1}^i)$
4:    assign particle weight $w_t^i = p(z_t|x_t^i)$
5: end for
6: calculate total weight $k = \Sigma_{t-1}^N w_t^i$
7: for i = 1 to N do
8:    normalise $w_t^i = k^{-1} w_t^i$
9:    $\overline{X}_t = \overline{X}_t + \{x_t^i, w_t^i\}$
10: end for
11: $X_t$ = Resample ($\overline{X}_t$)
12: return $X_t$

--- where:
- $\overline{\chi}_t, \chi_t$ ... is the set of particles,
- N ... is the number of particles,
- $x_t^i$ ... is a particle state including particle location,
- $w_t$ ... is a particle weight,
- $p(x|x_t^i)$ ... is transition distribution and
- $p(z|x_t^i)$ ... is measurement distribution.

Implementation of step 116 is described in more detail in a separate section below.

Step 117

The actual ranking (the likelihood estimation) of the $h^{th}$ trajectory is calculated taking primarily into account the localisation error and also other contextual information such as the motion behaviour pattern of the mobile nodes in the area of interest.

In the presented implementation the $h^{th}$ trajectory likelihood is calculated as a probability govern by Gaussian distribution with the mean localisation error of 0 meters and standard deviation of 3 m by the following expression:

$$\omega^h = \frac{1}{\sigma\sqrt{2\pi}} \exp\left(-\frac{\varepsilon^2}{2\sigma^2}\right) \quad (5)$$

where:
- $\omega^h$ ... denotes trajectory likelihood,
- $\sigma$ ... represents the standard deviation of the Gaussian distribution.
- $\varepsilon$ ... represents the localisation error and Localisation error in (5) is calculated as the mean Euclidian distance between the mobile node locations estimated by a formal localisation algorithm such as the particle filter and the ground truth positions along the $h^{th}$ trajectory $$\varepsilon = \frac{1}{N} \sum_N \|\hat{x} - x_{GT}\| \quad (6)$$

where:
- N ... is the number of the measurement along the $h^{th}$ trajectory,
- $x_{GT}$ ... are the ground truth positions and
- $\hat{x}$ ... are the positions estimated by a formal localisation algorithm.

Step 118

The end of the trajectories (hypothesis) likelihood evaluation loop.

Step 119

Selection of a limited number of the most likely trajectories (hypothesis) for the $h^{th}$ mobile node. The other trajectories are terminated.

Figure 14:
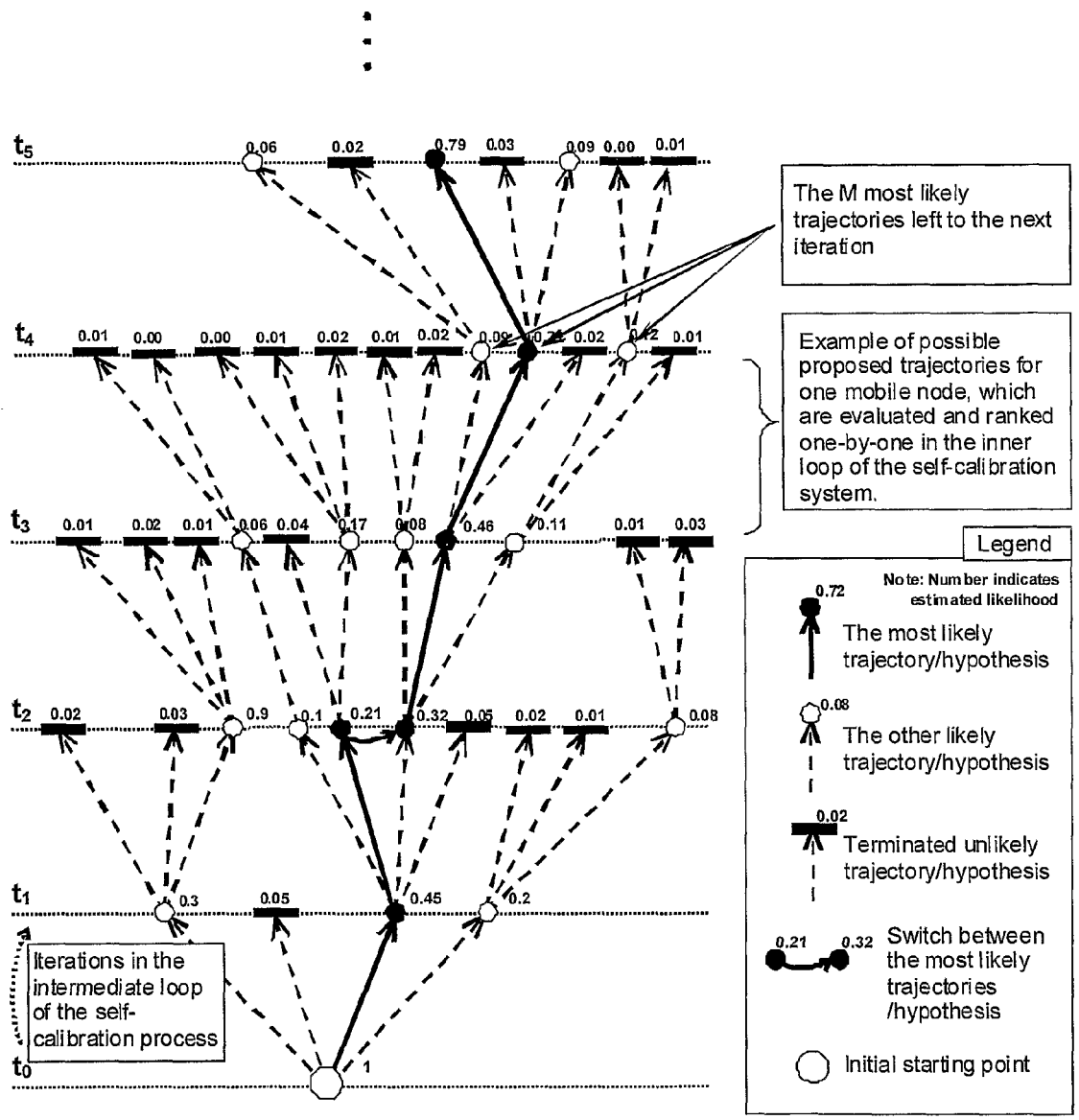
FIG. 14 is a diagram illustrating how the system dynamically maintains options and probabilities on possible trajectories.

FIG. 14 shows an example of the evolution of the self-calibration process as a hypothesis tree for a mobile node where individual branches represent its possible trajectories, which are maintained or terminated depending on their estimated likelihood. The most likely trajectory is the trunk of the tree.

The system configuration in this implementation sets the threshold for the trajectories termination to 0.05. The threshold value impacts the number of maintained hypotheses, therefore, the computational requirements of the self-calibration system.

Step 120

This is the end of the mobile node multi-hypothesis trajectory evaluation. At the end of this loop every participating mobile node has an associated set of most likely hypotheses of trajectories.

Step 121

The process of ranking combined hypothesis follows the same steps as the ranking of the individual node trajectories from points 9 to 16, however, the optimisation of parameters of obstacles can be simplified by averaging, for example.

Step 122

This is selection of a limited number of the most likely combined-trajectories, $H_c$. The other trajectories (hypotheses) are discontinued.

Figure 15:
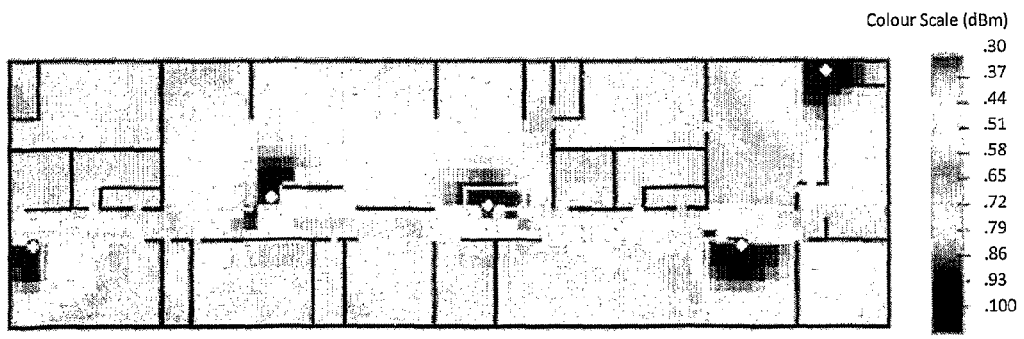
FIG. 15 is a sample calibrated fingerprint generated by the system after several iterations of self-calibration, in which the fingerprint differs from the fingerprint shown in FIG. 8 in the optimised parameters of the environment model (such as. wall parameters), which were used in the fingerprint predication mode.

FIG. 15 shows a final predicted fingerprint based on the calibrated wall segment parameters. The scale represents level of predicted channel parameter such as signal strength in regular grid Particle Filter Algorithm: Step 116

The particle filter is a non-parametric implementation of the Bayes' filter. It approximates the posterior probability by a finite number of discrete samples with associated weights, called particles. The approximation of the posterior density is non-parametric. Therefore, it can represent a wider distribution than the parametric one, such as Gaussian. The particles are mapped to the physical environment model, and so the processor can generate visualisation user displays of the environment with the particle distribution illustrated.

The particle filter directly estimates the posterior probability of the state expressed in the following equation:

$$p(x_t | z_t) \approx \sum_{i=1}^{N} w_t \delta(x_t - x_t^i) \quad (7)$$

where:
$x_t^i$ ... is the $i^{th}$ sampling point or particle of the posterior probability with $1 < i < N$,
$w_t^i$ ... is the weight of the particle and
N ... represents the number of particles in the particle set, denoted by $X_t$.

$$\chi_t := x_t^1, x_t^2, x_t^3, \ldots, x_t^N \quad (8)$$

Each particle is a concrete instantiation of the state at time t, or put differently, each particle is a hypothesis of what the true state $x_t$ might be, with a probability given by its weight.

The property of equation (eqn. 7) holds for $N \uparrow \infty$. In the case of finite N, the particles are sampled from a slightly different distribution. However, the difference is negligible as long as the number of particles is not too small.

---

Algorithm 3.2 Particle_Filter ($X_{t-1}, z_t$)

1: $\overline{X}_t = X_t = \emptyset$
2: for i = 1 to N do
3:   sample $x_t^i \sim p(x_t | x_{t-1}^i)$
4:   assign particle weight $w_t^i = p(z_t | x_t^i)$
5: end for
6: calculate total weight $k = \Sigma_{t-1}^N w_t^i$
7: for i = 1 to N do
8:   normalise $w_t^i = k^{-1} w_t^i$
9:   $\overline{X}_t = \overline{X}_t + \{x_t^i, w_t^i\}$
10: end for
11: $X_t$ = Resample ($\overline{X}_t$)
12: return $X_t$

---

The algorithm 3.2 above describes a generic particle filter algorithm. The input of the algorithm is the previous set of the particle $X_{t-1}$, and the current measurement $z_t$, whereas the output is the recent particle set $X_t$. The algorithm will process every particle $x_{t-1}^i$ from the input particle $X_{t-1}$ as follows.

Line 3 shows the prediction stage of the filter. The particle $x_t^i$ is sampled from the transition distribution $p(x_t | x_{t-1})$. The set of particles resulting from this step has a distribution according to (denoted by ~) the prior probability $p(x_t | z_{t-1})$. Line 4 describes incorporation of the measurement $z_t$ into the particle. It calculates for each particle $x_t^i$ the importance factor or weight $w_t^i$. The weight is the probability of particle $x_t^i$ received measurement $z_t$ or $p(z_t | x_t)$. Lines 7 to 10 are steps required to normalise the weight of the particles. The result is the set of particles $\overline{\chi}_t$, which is an approximation of posterior distribution $p(x_t | z_t)$. Line 11 describes the step which is known as re-sampling or importance re-sampling. After the re-sampling step, the particle set, which was previously distributed in a manner equivalent to prior distribution $p(x_t | z_{t-1})$ will now be changed to particle set $X_t$ which is distributed in proportion to $p(x_t | z_t)$.

Re-Sampling

The early implementation of particle filter is called sequential important sampling (SIS). Implementation of SIS is similar to algorithm 3.2 above, but without the resample step (algorithm 3.2 line 11). The SIS approach suffers an effect which is called the degeneracy problem. This occurs when, after some sequence time t, all but one particle has nearly zero weight. The problem happen since generally impossible to sample directly from posterior distribution, particles are sampled from related distribution, termed importance sampling. The choice of importance sampling made the degeneracy problem is unavoidable. The degeneracy problem will increase the weight variance over time and has a harmful effect on accuracy.

Re-sampling is an important step to overcome the degeneracy problem. It will force the particle to distribute according to the posterior density $p(x_t | z_t)$.

---

Algorithm 3.3 Resample ($X_t$)

1: $X_t^* = \emptyset$
2: for j = 1 to N do
3:   r = random number uniformly distributed on [0,1]
4:   s = 0.0
5:   for i = 1 to N do
6:     s = s + $w_t^i$
7:     if s ≥ r then
8:       $x_t^{*j} = x_t^i$
9:       $w_t^{*j} = 1/N$
10:      $X_t^* = X_t^* + \{x_t^{*j}, w_t^{*j}\}$
11:    end if
12:  end for
13: end for
14: replacement $\overline{X}_t = X_t^*$
15: return $\overline{X}_t$

---

Algorithm 3.3 above describes a re-sampling step of particles. The modification lies in the iteration to draw newly sampled particles. The input of the algorithm is a set of particles and the output is the new resampled particles.

Line 3 shows the generation of random number r. Lines 5 to 8 show the re-sampling steps. Line 8 shows when a particle is re-sampled only if its weight contribution causes the summation in line 6 to exceed or equal to the random sample r. The probability of drawing a particle is in proportion to its importance factor. Particles with lower weight will have a lower chance and some will not be resampled. Since the re-sampling process is performed every time step, the new particles do not need to know the old weight and their weight will be set equally, as shown in line 9. Line 14 shows when members of particle set t is replaced by new resampled particles.

The particle filter, which is a non-parametric implementation of Bayes' filter, is well suited for state estimation in opportunistic system for a number of reasons. It is suitable for state estimation for a system that has large process noise in state dynamics, and it provides a good processor performance.

To implement a particle filter for opportunistic indoor localisation, motion and measurement probabilistic models have been devised, s described below.

Motion Model

This implements a particle filter for and opportunistic system. It is a representation of the target's kinematics behaviour. It is used to construct the transition probability $p(x_t|x_{t-1})$ which has an important role for the prediction step in the particle filter. The first-order of person kinematics is less conservative than Brownian movement, in a way that the motion is not totally random as in Brownian movement. Therefore it is often more accurate. It assumes that the target direction is the same as the last observing movement. However, this assumption does not hold when people turn direction in a corner, enter a room, or avoid obstacles. This kind of action therefore is difficult to represent. Our approach for the motion model in indoor localisation is taken from both Brownian movement and a first-order motion model. The motion model assumes that the kinematics of a target has random values in it. However, this randomness is constrained by the previous state. This approach accurately reflects the target's kinematics behaviour (i.e.: a person) in opportunistic system. Especially, in a system that only uses RSS measurement, without additional motion sensor.

Velocity

To accommodate simple human locomotion patterns (such as remaining stationary, walking and running) and its limitations, the target velocity is constrained to take place only between limited ranges of speed. The succeeding velocity also takes into account the preceding one, since it is assumed that people tend not to change their kinematics abruptly in a normal condition. Based on observation of peoples' movement in the standard environment, the target velocity is given by the following rule:

$$v_t = \mathcal{N}(v_{t-1}, \sigma_v) \text{ and} \tag{9}$$

$$v_t = \begin{cases} v_t, & 0 \le v_t \le \text{Max}_{vt} \\ v_t = |v_t|, & v_t < 0 \\ 2\text{Max}_{vt} - v_t, & \text{Max}_{vt} < v_t \end{cases}$$

with $$\sigma_v = \min(\text{Max}_{\Delta_t}, \sqrt{\Delta_t}) \tag{10}$$

where:
N . . . represents a Gaussian random number generator,
$\text{Max}_{vt}$ . . . represents the maximum speed.
min( ) . . . is a function which returns the smallest component,
$\Delta_t$ . . . represents elapsed time,
$\text{Max}_{\Delta_t}$ . . . represents the maximum threshold of the $\Delta t$.

Figure 16:
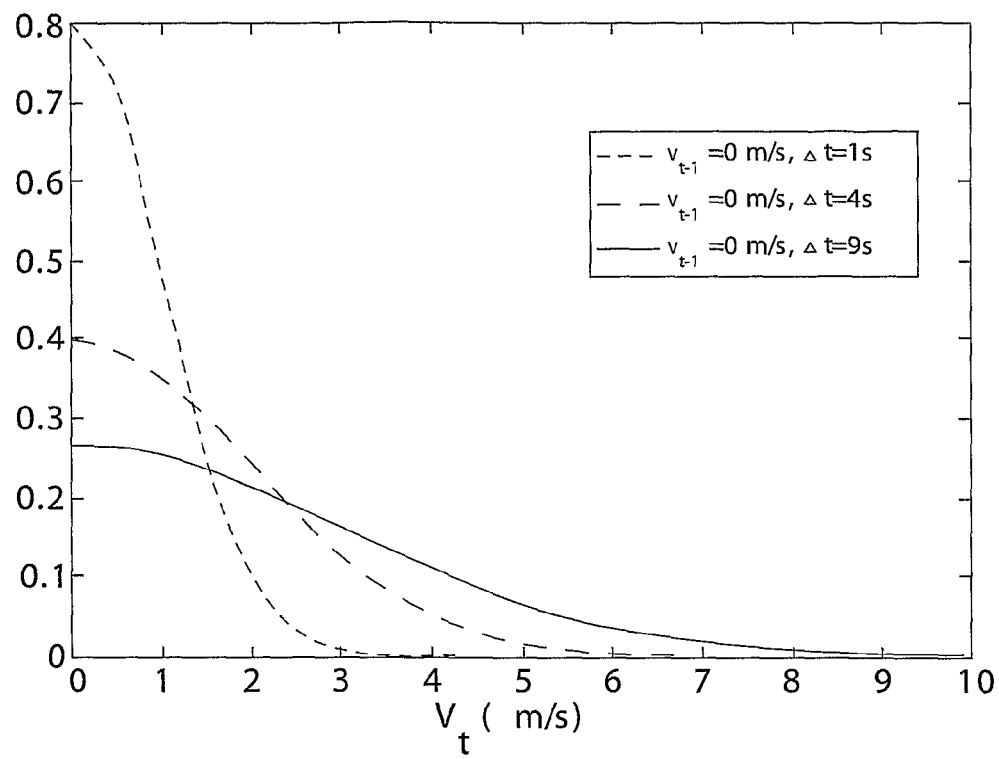
FIGS. 16 to 23 are diagrams illustrating implementation of a particle filter algorithm.

The value of $\text{Max}_{vt}$ is set to the fastest recorded human speed ($\approx$10 m/s) and $\text{Max}_{\Delta t}$=3 s. FIG. 16 shows an example of the velocity probability distribution function (PDF) when $v_{t-1}$=0 m/s with various $\Delta_t$.

Direction

The succeeding direction also considers that preceding it. A velocity parameter is also included in the direction calculation. The motivation is to limit heading variation based on preceding speed, since people tend to slow down when they want to change their direction of movement. The target direction is given by the following rule:

$$\alpha_t = \mathcal{N}(\alpha_{t-1}, \sigma_h) \text{ and} \tag{11}$$

$$\alpha_t = \begin{cases} \alpha_t, & -\pi \le \alpha_t \le \pi \\ \alpha_t + 2\pi, & \alpha_t < -\pi \\ \alpha_t - 2\pi, & \alpha_t > \pi \end{cases}$$

with $$\sigma_h = 0.4\pi - \arctan\left(\frac{\sqrt{v_{t-1}}}{2}\right) \tag{12}$$

where $\alpha_t$ represents direction at time t, $\sigma_h$ represents the direction standard deviation.

Figure 17:
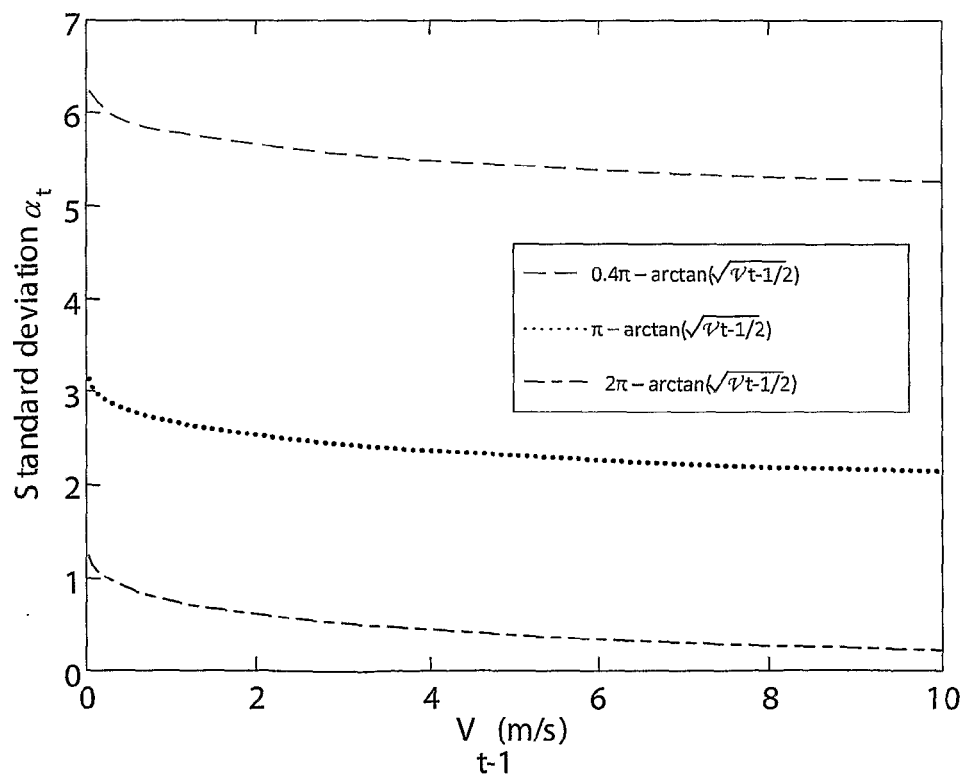
Figure 18:
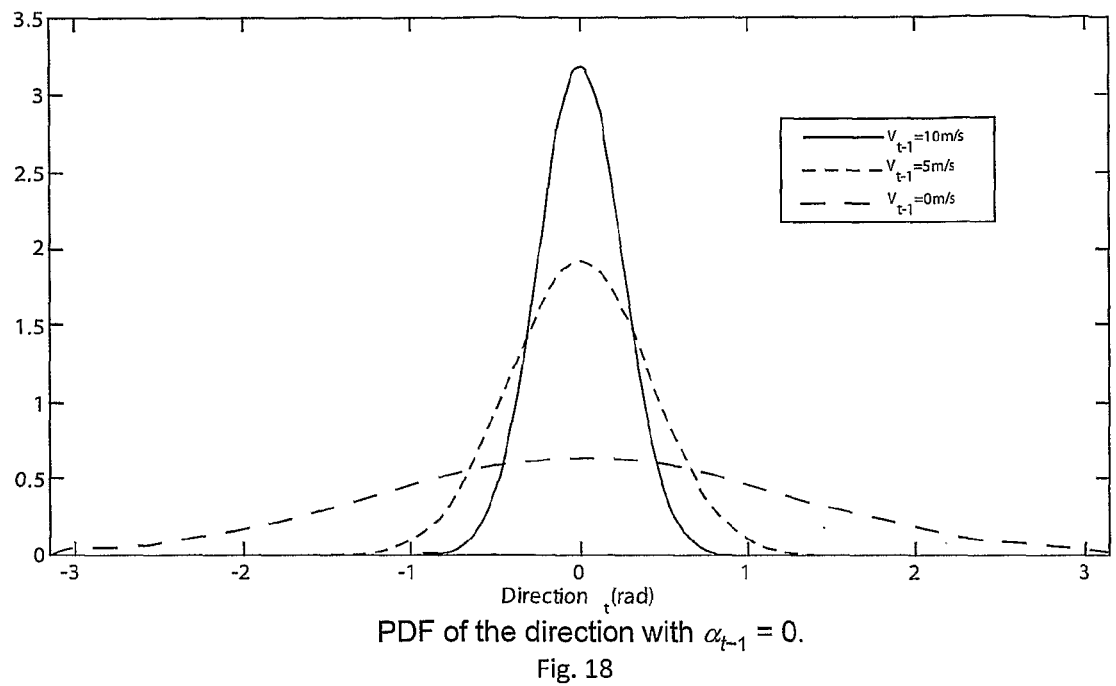

FIG. 17 shows the $\sigma_h$ for different velocities. FIG. 18 presents PDF of the direction based on different velocities with $\alpha_{t-1}$=0. It can be seen that the heading variation is narrower when the velocity is increased.

Particle Motion Model

Each particle, which is a hypothesis of the target state in the real world, will have a kinematic characteristic according to the motion model during the prediction stage. The particle state can be modelled with:

$$x_t^i = \begin{bmatrix} x_t^i \\ y_t^i \end{bmatrix} = \begin{bmatrix} x_{t-1}^i + v_t^i \cos(\alpha_t^i)\Delta t + n_t \\ y_{t-1}^i + v_t^i \sin(\alpha_t^i)\Delta t + n_t \end{bmatrix} \tag{13}$$

where:
$v_t$ . . . denotes velocity,
$\alpha_t$ . . . describes particle direction at the time t,
$n_t$ . . . is a noise with Gaussian distribution.

The particles' velocity is governed by equation (9), whereas particles' direction is given by equation (11). The noise $n_t$ is added to achieve a better distribution by preventing particles from collapsing into a single point. A $n_t$ value of 0.5 m is used for this work.

Figure 19:
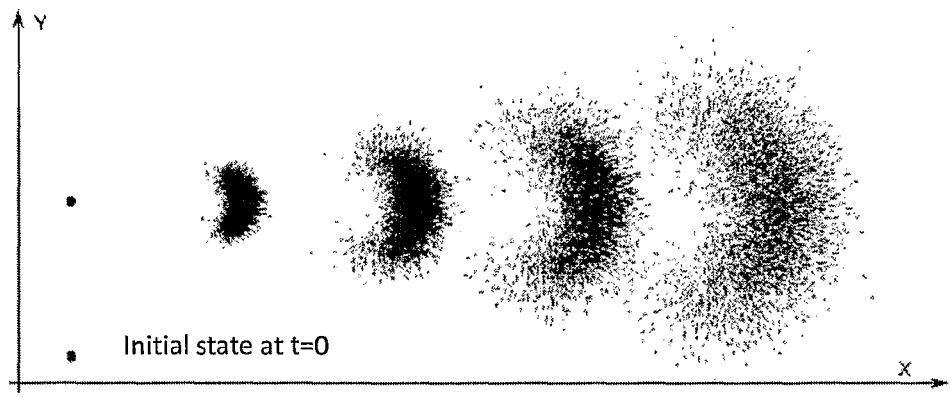

FIG. 19 illustrates the evolution of particle distribution determined only by the motion model. The particle distribution is started from a known state in 2D space. The initial velocity $v_0$=3 m/s and number of particles are 2000. Since there is no RSS measurement update performed, the distribution spreads wider over time.

The aforementioned particle distribution, which was constructed with the motion model, is a representation of transition probability. This density needs to be updated with the measurement probability $p(z_t|x_t)$ to obtain the posterior distribution. The construction of measurement probability with the measurement model in an opportunistic system is explained in the next section.

Measurement Model

The measurement model describes a construction process by which the sensor measurement is generated. This model is utilised to obtain the measurement probability of $p(z_t|x_t)$, often referred to as the likelihood observation function. In the particle filter, this function is used to incorporate a measurement update into the particle weight $w_t^i$.

There is a measurement model which considers the physical characteristics of signal propagation in indoor environments based on the fingerprinting method.

A fingerprint is a database of stored RSS measurements throughout the coverage area of all discrete possible states. These discrete states are often referred to as the "true" RSS values obtained by the sensor, denoted by $z^+_t$, at the state $x_t$. Theoretically, smaller grid size gives better localisation accuracy since the measurement model will be more distinct between grids. However, it is technology dependent. Based on the observations, WLAN RSS values are discernible when they are measured in a grid ≥1 m, for example.

To obtain the likelihood observation function, statistical inference is performed between a true value stored in the fingerprint and recent RSS measurement (termed as signature).

The mobile device is able to simultaneously retrieve RSS measurements from different APs, therefore $z_t$ is a set of measurements which is described as:

$$z_t = \{z_t^1, z_t^2, z_t^3, \ldots, z_t^K\} \quad (14)$$

where:
$z_t^k \ldots$ denotes RSS value $z_t$ at time t from AP with identification k (MAC address is used for WLAN AP)

The probability $p(z_t|x_t)$ is obtained as the product of the individual likelihood observation function.

$$p(z_t | x_t) = \prod_{k \in z_t} p(z_t^k | x_t) \quad (15)$$

Algorithm for the Measurement Model

The measurement model comprises three types of probability densities, each of which corresponds to a type of dissimilarity:

1. Measurement with noise. Assuming that the sensor can capture the true RSS measurement, the returned value is still subject to error caused by shadowing (or slow fading) and multipath fading. This fading, which appears as a time-varying process, makes the RSS value fluctuate even when it is measured at the same position.

Figure 20:
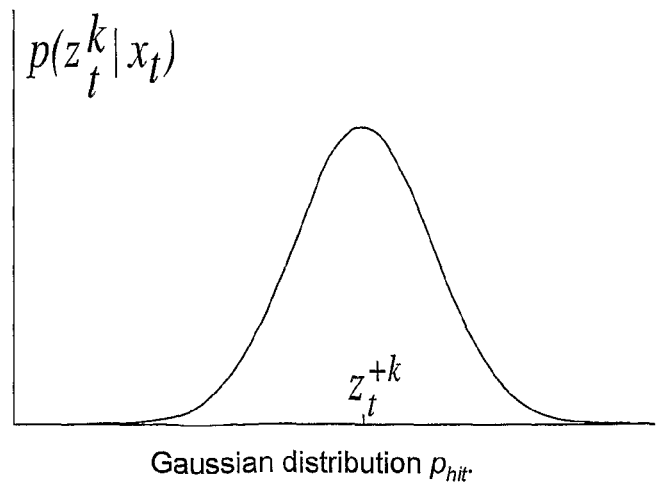

Since the sensor (i.e. WLAN interface) has an internal mechanism to suppress multipath fading, the received error is largely caused by shadowing which has a Gaussian distribution. Therefore, the noisy measurement may be modelled with a Gaussian distribution with mean value of $z_t^{+k}$ and standard deviation of $\sigma^+$. The Gaussian is denoted by $p_{hit}$ as described in FIG. 20.

The value of $z_t^{+k}$ is given by the RSS measurement stored in the corresponding grid of the fingerprint. The measurement probability is governed by $$p_{hit}(z_t^k | x_t) = \mathcal{N}(z_t^k; z_t^{+k}, \sigma_+) \quad (16), (17)$$

$$= \frac{1}{\sigma_+ \sqrt{2\pi}} \exp\left(-\frac{(z_t^k - z_t^{+k})^2}{2\sigma_+^2}\right)$$

where $z_t^{+k}$ is the RSS value stored in the fingerprint and $z_t^k$ is the recent signature such that $\{k \in z_t \cap z_t^+\}$ or, to put it differently, the RSS value from an AP which appears in both signature and fingerprint. Notation $\sigma+$ is the intrinsic noise parameter for the measurement model.

2. Missing RSS. Considering that it may be the case that not all of the RSS values that appear in the fingerprint grid and signature coming from the same APs, a question arises as to how to account for such data. This condition can happen when the signature is taken at a different location or there is an extra/missing AP. In the case of no extra/missing AP, a different set of RSS values in the fingerprint grid and signature means that they are taken at different locations. Incorporating this information into the measurement model will eventually lead to better localisation accuracy. In the case of RSS measurements from an AP which is missing in the signature but which is present in the fingerprint, the measurement probability is modelled by a Gaussian denoted by $p_{miss}$. The measurement probability is governed by:

$$p_{miss}(z_t^k | x_t) = \mathcal{N}(\eta; 0, \sigma_+) \quad (18), (19)$$

$$= \frac{1}{\sigma_+ \sqrt{2\pi}} \exp\left(-\frac{\eta^2}{2\sigma_+^2}\right)$$

where $\eta$ is the penalty parameter given for the missing RSS. The density $p_{miss}$ is calculated for missing $z_t^k$ such that $\{k \in z_t^+ - z_t\}$.

3. Extra RSS. In the case where there is an extra RSS value of an AP which exists in the signature but which is absent in the fingerprint, the measurement probability is also modelled by a Gaussian denoted by $p_{extra}$ and governed by:

$$p_{extra}(z_t^k | x_t) = \mathcal{N}(\eta; 0, \sigma_+) \quad (20), (21)$$

$$= \frac{1}{\sigma_+ \sqrt{2\pi}} \exp\left(-\frac{\eta^2}{2\sigma_+^2}\right)$$

where $\eta$ is the penalty parameter given for the extra RSS. The density $p_{extra}$ is calculated for extra $z_t^k$ such that $\{k \in z_t - z_t^+\}$.

These three densities are combined to obtain the likelihood observation function of RSS measurement $p(z_t|x_t)$. The likelihood observation function is given by:

$$p(z_t | x_t) = \left[\prod_{k \in K} p_{hit}(z_t^k | x_t)\right]^{\frac{t}{|K|}} \cdot \prod_{k \in L} p_{miss}(z_t^k | x_t) \cdot \prod_{k \in M} p_{extra}(z_t^k | x_t) \cdot \beta \quad (22)$$

with $$\beta = \frac{|K|}{|K| + |L| + |M|}$$

where:
K ... is the set of measurement in $(z_t \cap z_t^+)$,
L ... is the set of measurement in $(z_t^+ - z_t)$,
M ... is the set of measurement in $(z_t - z_t^+)$.

The expressions of |K|, |L|, |M| denotes the number of elements in K, L, M respectively.

β ... represents the weighting factor and
k ... denotes AP identification.

Algorithm 3.4 describes the steps necessary to obtain the likelihood observation function. The input of the algorithm is the measurement $z_t$ and the state $x_t$. The output is the likelihood observation function of $p(z_t|x_t)$.

---
Algorithm 3.4 Measurement_Model $(z_t, x_t)$
---
1: p = 1
2: q = 1
3: y = 1
4: S = 0
5: get $z_t^+$ from the fingerprint
6: for k ∈ K do
7:     p = p·$p_{hit}(z_t^k|x_t)$
8: end for
9: p = $p^{1/|K|}$

| Algorithm 3.4 Measurement_Model ($z_t$, $x_t$) |
|---|
| 10: for k ∈ L do |
| 11:    q = q·$p_{miss}$($z_t^k$\|$x_t$) |
| 12: end for |
| 13: for k ∈ M do |
| 14:    q = q·$p_{extra}$($z_t^m$\|$x_t$) |
| 15: end for |
| 16: S = \|K\| ÷ (\|K\| + \|L\| + \|M\|) |
| 17: y = p.q.S |
| 18: return y |

The intrinsic noise parameter for the measurement model σ+ is set to 4 dBm which was observed as a appropriate value for common indoor environments.

The value of the penalty η in equation (19) of $p_{miss}$ and (21) of $p_{extra}$ is governed by the following expression $$\eta = \begin{cases} (5/30)(z_t + 100), & z_t \leq -70 \\ (15/25)(z_t + 70) + 5, & -70 < z_t \leq -45 \\ 20, & z_t > -45 \end{cases} \quad (23)$$

The aforementioned equation is formulated to mimic the tail part of a Gaussian distribution. The RSS range is taken from maximum and minimum RSS values measurable from a WLAN interface (−100 dBm and −45 dBm). Maximum penalty is given by the maximum signal loss caused by people shadowing (20 dBm). Linear interpolation is used to obtained penalty η values.

Figure 21:
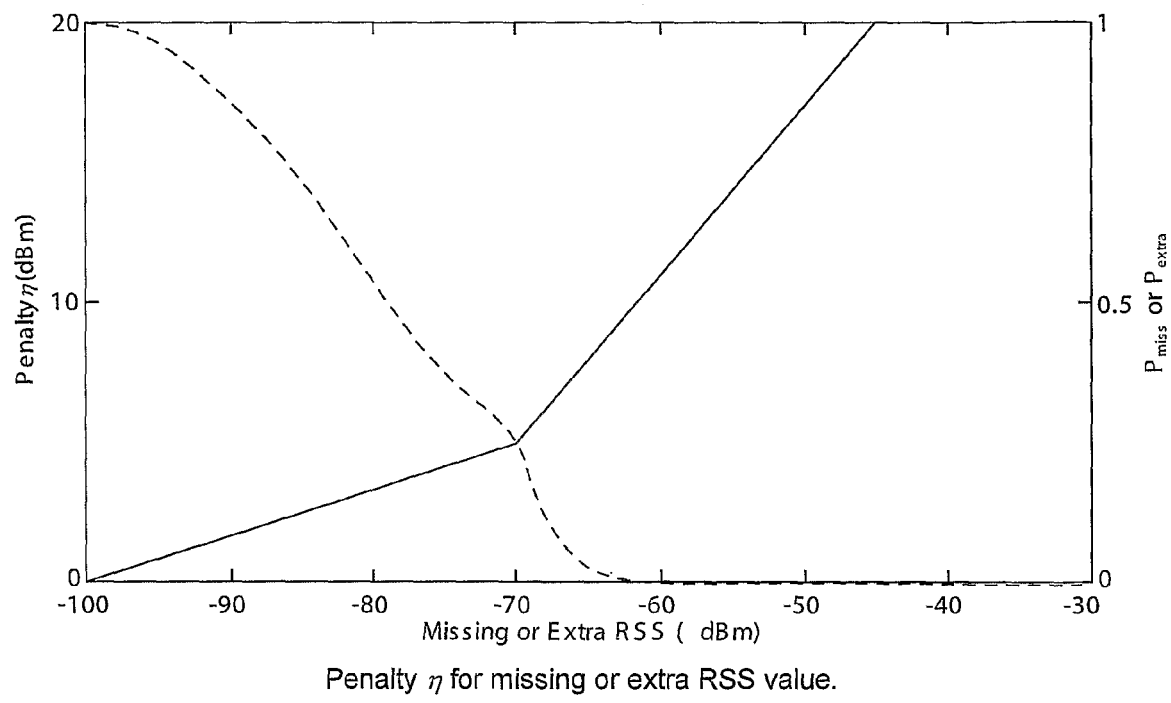

The result is that the value of η is in proportion to the RSS value missing in the fingerprint $z^+_t$ or extra in $z_t$. Greater missing/extra RSS values, will have a proportionately higher penalty η (FIG. 21).

The value of intrinsic parameters of standard deviation σ+ and penalty η can be applied to environment similar with office setting (characterised by many walls, corridors and rooms), such as hospital, campus or apartment.

EXAMPLES

Figure 22:
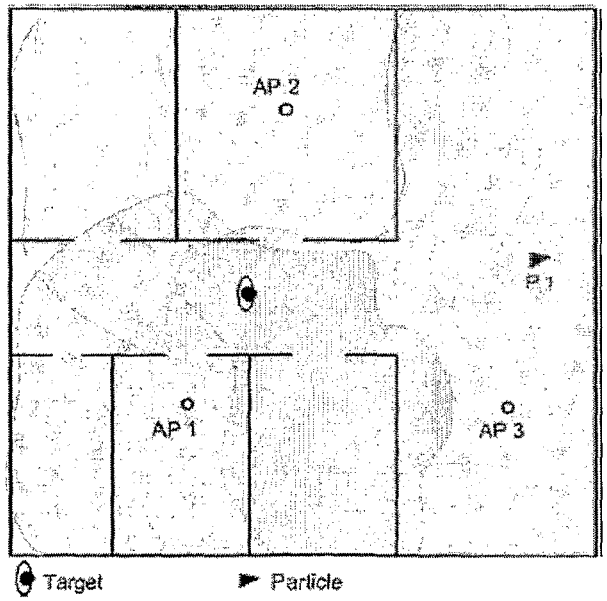

FIG. 22 is used to illustrate how to obtain the likelihood observation function of a particle $p(z_t|x^I_t)$. It shows a fingerprint from 3 APs, a target and a particle.

Supposing that the target measured RSS value $z_t$={AP1=−70 dBm, AP2=−70 dBm, AP3=−75 dBm}. The corresponding fingerprint grid where the particle x is located, has value of $z^+_1$={AP3=−65 dBm}. If the value of both σ+ and η are set to 4 dBm, the $p(z_t|x^I_1)$ can be calculated as follows:

Calculating $p_{hit}$ from AP3 with equation (19):

$$p_{hit}(z_t^3|x_t^1) = \frac{1}{\sigma_+\sqrt{2\pi}} \exp\left(-\frac{(z_t^k - z_t^{+k})^2}{2\sigma_+^2}\right)$$
$$= \frac{1}{4\sqrt{2\pi}} \exp\left(-\frac{(-75-(-65))^2}{2.4^2}\right)$$
$$= 0.0044$$

Calculating $p_{extra}$ from AP1 and AP2 with equation (21):

$$p_{extra}(z_t^1|x_t^1) \cdot p_{extra}(z_t^2|x_t^1) = \left(\frac{1}{\sigma_+\sqrt{2\pi}} \exp\left(-\frac{\eta^2}{2\sigma_+^2}\right)\right)^2$$
$$= \left(\frac{1}{4\sqrt{2\pi}} \exp\left(-\frac{(4)^2}{2.4^2}\right)\right)^2$$
$$= 0.0037$$

Calculating $p(z_t|x^I_t)$ with equation (22):

$$p(z_t|x_t^1) = 0.0044 \cdot 0.0037 \cdot \frac{1}{1+2}$$
$$= 0.0000054$$

Measurement Model & Particles Distribution

Figure 23:
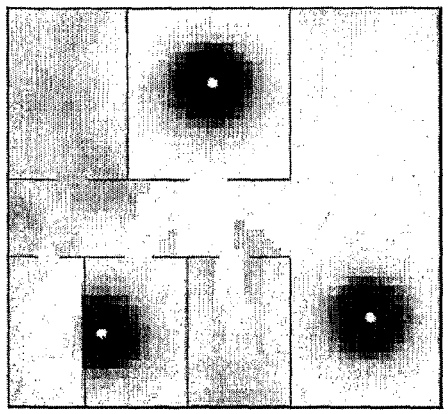
Figure 23:
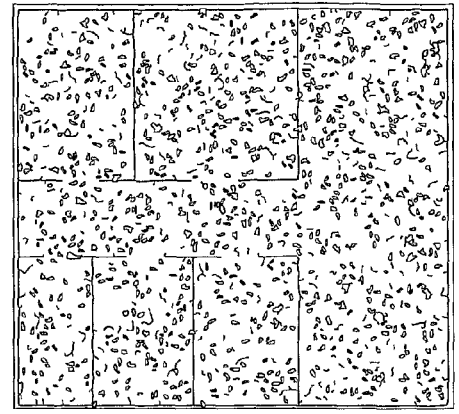
Figure 23:
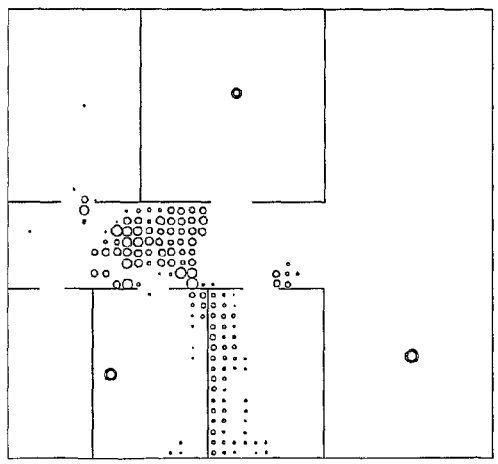
Figure 23:
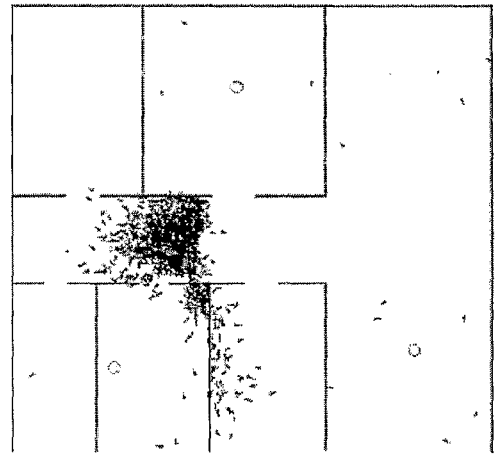

The likelihood observation function update to the particle distribution is illustrated in FIG. 23. FIG. 23(a) shows three access points and its RSS measurement throughout the coverage area which is used as the fingerprint. In the initial time, the particles will be uniformly distributed as shown in FIG. 23(b). Once measurement $z_t$ is obtained, the likelihood observation function or measurement probability is calculated based on equation (22). The result is illustrated in FIG. 23(c). Higher likelihoods are shown with bigger blue circles. Furthermore, the particles' weight is updated with the likelihood observation function and subsequently is resampled. The new particle distribution and estimated target location are shown in FIG. 23(d).

Estimation of Target State

Once the posterior probability is obtained, the state is estimated using a particle set $X_t$ which is distributed in proportion to $p(x_t|z_t)$ ($X_t$ is a return value of algorithm 3.2 of particle filter). Algorithm 3.5 below describes steps to estimate this state.

| Algorithm 3.5 State_Estimation($X_t$) |
|---|
| 1: $\hat{x}_t = 0$ |
| 2: for i = 1 to \|$X_t$\| do |
| 3:    $\hat{x}_t = \hat{x}_t + x_t^i \cdot w_t^i$ |
| 4: end for |
| 5: return $\hat{x}_t$ |

It will be appreciated that the invention enables an automatic generation and update of the channel parameters fingerprint, merely initially requiring knowledge of layout of dominant obstacles and system infrastructure in the environment (the floor plan and system fixed node positions, for example). This is not onerous. It will also be appreciated that the invention avoids need for dedicated hardware, as it can use the hardware of an existing wireless network such as a WiFi network.

The invention is not limited to the embodiments described but may be varied in construction and detail. For example, it may be applied to outdoor location and tracking systems in particular areas. Also, the initial physical environmental model may be received in the initial inputs rather then being generated by the system.

The invention claimed is:

1. A location and tracking system comprising wireless base stations, an input interface, and a processor, wherein the processor is configured to:

(a) receive via the input interface initial physical environment inputs for an environment, said inputs including data representing geometry lines in plan and default signal attenuation values for said lines, and to provide, according to said inputs, a physical environment model with wall segment parameters, wherein said inputs include:
  layout of main obstacles including building floor plans and wall layout; and
  layout of base stations;
(b) generate a channel parameters fingerprint of projected signal strengths in the environment according to the initial physical environment model;
(c) at time intervals:
  (c1) receive from a mobile node, via said wireless base stations, channel parameters of the mobile node in the environment, said channel parameters being gathered by the mobile node,
  (c2) determine possible mobile node trajectories, and
  (c3) simulate motion of the node along a $h_{th}$ trajectory to create a corresponding fitness function, said fitness function describing how similar channel parameters estimated along the $h^{th}$ trajectory are to said gathered channel parameters by the mobile node along its trajectory;
(d) modify said wall segment parameters of the physical environment model according to said fitness function of the $h_{th}$ mobile node trajectory by adjustment of current parameters of said wall segments towards optimised parameters of said wail segments which influence the channel parameters along the $h^{th}$ trajectory, in which the adjustment is given by:

$$Lw_t^i = Lw_{t-1}^i + \Delta Lw_t^i,$$

where:
  $Lw_t^i$ ... represents $i^{th}$ wall segment loss at time (index of iteration) t,
  $Lw_{t-1}^i$ ... represents $i^{th}$ wall segment loss at iteration t−1
  $\Delta Lw_t^i$ ... denotes delta of a wall segment loss at time t,
(e) update the channel parameters fingerprint according to the modification of the environment model in step (d);
(f) perform location error estimation which is based on the fingerprint updated in step (e) and gathered channel parameters and the $h_{th}$ trajectory as a ground truth;
(g) rank the $h^{th}$ trajectory as a $h^{th}$ hypothesis based on localisation errors along the trajectories;
(h) repeat steps (c3) to (g) in subsequent iterations for each of H hypotheses; and
(i) select a most likely hypothesis for the mobile node trajectory and terminate the other hypotheses.

2. The location and tracking system as claimed in claim 1, wherein the processor is configured to execute a filtering algorithm to perform location error estimation in step (f).

3. The location and tracking system as claimed in claim 1, wherein the processor is configured to use mobile node speed estimation for steps (c) and (d).

4. The location and tracking system as claimed in claim 1, wherein in step (a) the inputs include:
  layout of obstacles including building floor plans and wall layout;
  layout of base stations; and
  starting position of a mobile node, and
wherein for the step (a) the processor is configured to divide the obstacles into smaller segments and to optimise parameters of the smaller segments to more precisely represent each segment's mean local influence on signal attenuation.

5. The location and tracking system as claimed in claim 1, wherein in step (a) the inputs include:
  layout of main obstacles including building floor plans and wall layout;
  layout of base stations; and
  starting position of a mobile node, and
wherein for the step (a) the processor is configured to divide the obstacles into smaller segments and to optimise parameters of the smaller segments to more precisely represent each segment's mean local influence on signal attenuation, and wherein the processor is configured to apply parameters to the segments so that they characterise the obstacles they are part of and also the influence of smaller obstacles including furniture in proximity to large obstacles.

6. The location and tracking system as claimed in claim 1, wherein for step (c) the processor is configured to apply a formal optimisation method to find optimal parameters of obstacles which maximise similarity of predicted Channel parameters and gathered channel parameters along the $h_{th}$-trajectory.

7. The location and tracking system as claimed in claim 1, wherein the fitness function takes the form of a set of linear equations.

8. The location and tracking system as claimed in claim 1, wherein the processor is configured to execute a particle filter algorithm to locate the mobile node in step (f), in which particles are mapped to the physical environment as represented by the physical environment model, and wherein the processor is configured to generate visual displays of the physical environment in which particle distribution is illustrated for user visualisation of likelihoods of locations of the mobile node.

9. The location and tracking system as claimed in claim 1, wherein the processor is configured to execute a particle filter algorithm to locate the mobile node in step (f), in which particles are mapped to the physical environment as represented by the physical environment model, and wherein the processor is configured to generate visual displays of the physical environment in which particles distribution is illustrated for user visualisation of likelihoods of locations of the mobile node, and wherein the processor is configured to eliminate particles in successive iterations according to constraints imposed by the physical environment model and a motion model, in which remaining particles converge around the actual mobile node location, and wherein the processor is configured to automatically recognise rooms in the physical environment model and to maintain a count of particles in each room to provide a per-room probability of presence of the mobile node, and wherein the processor is configured to provide a random or uniform initial particle distribution mapped into the physical environment model, to filter the initial particle distribution with a likelihood observation function to generate a second particle distribution and to use said distribution for a next filtering iteration.

10. A location and tracking method performed by a location and tracking system comprising wireless base stations, an input interface, and a processor, wherein the method comprises the steps performed by the processor of:
  (a) receiving via the input interface initial physical environment inputs for an environment, said inputs including data representing geometry lines in plan and signal attenuation values for said lines, and providing, according to said inputs, a physical environment model with wall segment parameters wherein said inputs include:
    layout of main obstacles including building floor plans and wall layout; and
    layout of base stations;

(b) generating channel parameters fingerprint of projected signal strengths in the environment according to the initial. physical environment model;

(c) at time intervals:
   (c1) receive from a mobile node, via said wireless base stations, channel parameters of the mobile node in the environment, said channel parameters being gathered by the mobile node,
   (c2) determining possible mobile node trajectories, and
   (c3) simulating motion of the node along a $h_{th}$ trajectory to create a corresponding fitness function, said fitness function describing how similar channel parameters estimated along the $h^{th}$ trajectory are to said gathered channel parameters by the mobile node along its trajectory;

(d) modifying said wall segment parameters of the physical environment model according to said fitness function of the $h_{th}$ mobile node trajectory by adjustment of current parameters of said wall segments towards optimised parameters of said wall segments which influence the channel parameters along the $h^{th}$ trajectory, in which the adjustment is given by:

$$Lw_t^i = Lw_{t-1}^i + \Delta Lw_t^i,$$

where:
$Lw_t^i$ ... represents $i^{th}$ wall segment loss at time (index of iteration) t,
$Lw_{t-1}^i$ ... represents $i^{th}$ wall segment loss at iteration t−1,
$\Delta Lw_t^i$ ... denotes the delta of a wall segment loss at time t;

(e) updating the channel parameters fingerprint according to the modification of the environment model in step (d); and (f) performing location error estimation which is based on the fingerprint updated in step (e) and gathered channel parameters and the $h_{th}$ trajectory as a ground truth;

(g) ranking the $h^{th}$ trajectory as a $h^{th}$ hypothesis based on localisation errors along the trajectories;

(h) repeating steps (c3) to (g) in subsequent iterations for each of the H hypotheses; and (i) selecting a most likely hypothesis for the mobile node trajectory and terminate the other hypotheses.

11. A computer readable medium comprising non-transitory software code configured to perform operations of a location and tracking method of claim 10 when executing on a digital processor.

\* \* \* \* \*